3,666,494
EARTHY FLAVOR COMPOSITION COMPRISING DIACETYL AND 2,4,5-TRIMETHYL OXAZOLE

Alan P. Bentz, Stamford, Conn., and Joseph F. Mezzino, Pearl River, N.Y., assignors to General Foods Corporation, White Plains, N.Y.
No Drawing. Filed Oct. 16, 1970, Ser. No. 81,519
Int. Cl. A23l 1/26
U.S. Cl. 99—140 R    9 Claims

ABSTRACT OF THE DISCLOSURE

An earthy, potato-like or mushroom-like flavor is imparted to foodstuffs by a mixture of 2,4,5 - trimethyloxazole and diacetyl.

SUMMARY OF THE INVENTION

This invention relates to a flavor composition and to a method for preparing flavored foodstuffs, in particular foodstuffs wherein an earthy, mushroom-like or potato-like flavor is desirable. The flavor composition of this invention comprises a mixture of:

(A) diacetyl
(B) 2,4,5-trimethyloxazole each present in a relative proportion of from 4 moles of A and 1 mole of B to 1 mole of A and 4 moles of B.

There are many convenience foods on the market today, both synthetic and those processed directly from natural foodstuffs. Although the flavor and aroma characteristics of these convenience foods are remarkably close to the flavor and aroma of the natural foodstuff or home prepared recipe, they are often met with the objection that these characteristics are too shallow or that the flavor impression is lessened as the food is consumed.

This invention is based upon the discovery that the flavor characteristics of foods are enhanced or improved by the addition of a minor amount of the flavor composition of the invention, which imparts an "earthy" note to the food to which it is added. This "earthy" not is best characterized as the base tone found in potatoes, mushrooms and the like and is a very desirable addition in food such as mashed potatoes, other potato products, soup, gravy, vegetable juices, chowders, other foods based on meat and/or vegetables and the like.

DETAILED DESCRIPTION OF THE INVENTION

As indicated above, the flavor composition of the invention is based on a mixture comprising diacetyl and 2,4,5-trimethyloxazole. Diacetyl is a commercially available ketone of the formula $C_4H_6O_2$ and is best characterized as possessing a buttery flavor and aroma. The compound 2,4,5 - trimethyloxazole [TMO] is a heterocyclic compound of the formula $C_6H_9NO$ and is known in the literature. It may be conveniently prepared by reacting 2-bromo-3-butanone and acetamide in a solvent free medium at a temperature of 110 to 120° C. for a period of about 3 hours, followed by distillation and collection of the fraction with a boiling point of 42 to 48° C. (20 mm. mercury). TMO is sour and bitter to the taste and has the odor of sweet pyridine.

The fact that the combination of diacetyl and TMO give rise to an "earthy" note in food is most unexpected in view of the individual flavor characteristics of these compounds. It is not clear whether the combination of these compounds forms a simple mixture or an adduct, but it is clear that synergism is involved since the "earthy" flavor note of the composition is nothing like the buttery note of diacetyl or the sour, sweet pyridine notes of TMO.

The flavor composition of the invention can be prepared by simply admixing diacetyl with TMO in a relative molar ratio of 4 moles diacetyl and 1 mole TMO to 1 mole diacetyl and 4 moles TMO. It is within these ranges that the "earthy" flavor note is detected by expert tasters. Although the ratios may be varied within the specified range to suit individual tastes, the preferred ratio is equimolar amounts of diacetyl and TMO. The amount of the flavor composition added to food may also be varied over a wide range to suit individual tastes. The most effective range is 0.1 to 20 parts per million, preferably 0.5 to 3 parts per million.

Since the flavor composition of the present invention is used in minute quantities, it is most practical to include water in the composition as a diluent or carrier for the components, generally in the range of .005 to 100 parts by weight of the diacetyl/TMO mixture per hundred parts by weight water. A most convenient concentration is 0.5 part by weight of the diacetyl/TMO mixture per hundred parts by weight water.

The flavor composition may be added directly to foodstuff as an aqueous solution or the aqueous solution may be combined with a fixative agent such as a gum or dextrin, followed by the conventional spray or freeze drying procedures to produce a powder.

The following examples are illustrative of the invention.

EXAMPLE I

A sample of .36 ml. of 2,4,5 - trimethyloxazole was added to 120 ml. of water and the solution stirred. To this solution was added 0.24 ml. of diacetyl, with stirring, to form a flavor stock solution containing about 0.5% by weight of an approximately equimolar mixture of 2,4,5-trimethyloxazole and diacetyl.

EXAMPLE II

Mashed potatoes were prepared from a package recipe using package dry solids with water, milk, salt and butter. A first 100 gram sample was removed and 0.025 ml. of the flavor composition of Example I added with thorough mixing. A second 100 gram sample was removed to serve as a control.

It was the opinion of an expert taste panel that the potato flavor of the treated sample was deeper and enhanced as compared with the control.

EXAMPLE III

A standard tomato beverage was divided into two 100 ml. portions. The flavor composition of Example I was admixed with one sample at a level of 0.025 ml.

It was the opinion of an expert taste panel that the treated sample had an enhanced earthy flavor with some desirable metallic notes detectable.

EXAMPLE IV

A gravy base was prepared and evalulated as in Example III.

It was the opinion of an expert taste panel that the treated sample had a more natural flavor, best characterized as mustier or meatier than the control.

What we claim is:
1. A flavor composition comprising a mixture of:
(A) diacetyl
(B) 2,4,5-trimethyloxazole
    each present in a relative proportion of from 4 moles of A and 1 mole of B to 1 mole of A and 4 moles of B.
2. The flavor composition of claim 1 wherein the diacetyl and 2,4,5-trimethyloxazole are present in approximately equimolar proportions.

3. A flavor composition comprising water and the flavor composition of claim 1.

4. A flavor composition comprising water and from .005 to 100 parts by weight per hundred parts by weight water of an approximately equimolar mixture of diacetyl and 2,4,5-trimethyloxazole.

5. A foodstuff containing a flavor enhancing amount of the flavor composition of claim 1.

6. A foodstuff containing 0.1 to 20 parts per million of the flavor composition of claim 2.

7. A process for imparting an earthy flavor to foodstuffs which comprises incorporating therein a flavor enhancing amount of a composition comprising a mixture of:
(A) diacetyl
(B) 2,4,5-trimethyloxazole each of A and B present in a relative proportion of from 4 moles of A and 1 mole of B to 1 mole of A and 4 moles of B.

8. The process of claim 7 wherein said flavor composition is incorporated into said foodstuff at a level of 0.1 to 20 parts per million.

9. The process of claim 8 wherein the diacetyl and 2,4,5-trimethyloxazole are added in approximately equimolar proportions.

References Cited

UNITED STATES PATENTS 2,505,811    5/1950    Szuecs _____ 99—140 R

OTHER REFERENCES

Brown et al.: "The Spectra, Ionization, And Deuteriation of Oxazoles and Related Compounds," Journal of the Chemical Society (B), vol. 3, 1969, pp. 270–276.

MORRIS O. WOLK, Primary Examiner

W. BOVEE, Assistant Examiner